(12) United States Patent
Saari

(10) Patent No.: US 7,158,481 B1
(45) Date of Patent: Jan. 2, 2007

(54) METHOD FOR PREDICTING A FILL-UP LEVEL OF A BUFFER IN AN ATM NETWORK ELEMENT

(75) Inventor: Jarmo Saari, Jyvaskyla (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/111,992

(22) PCT Filed: Nov. 5, 1999

(86) PCT No.: PCT/EP99/08499

§ 371 (c)(1),
(2), (4) Date: Jun. 11, 2002

(87) PCT Pub. No.: WO01/33899

PCT Pub. Date: May 10, 2001

(51) Int. Cl.
*G06F 11/00* (2006.01)
*H04L 12/26* (2006.01)
*H04L 12/38* (2006.01)
*H04L 12/56* (2006.01)

(52) U.S. Cl. .................. 370/235; 370/252; 370/395.1; 370/412

(58) Field of Classification Search ................ 370/252, 370/412–418, 395.7–395.72, 232–234
See application file for complete search history.

(56) References Cited

U.S. PATENT DOCUMENTS

| 5,276,677 | A | | 1/1994 | Ramamurthy et al. ......... 370/60 |
| 5,408,465 | A | | 4/1995 | Gusella et al. ............. 370/60.1 |
| 5,493,566 | A | * | 2/1996 | Ljungberg et al. .......... 370/231 |
| 5,844,891 | A | | 12/1998 | Cox ........................... 370/235 |
| 5,881,049 | A | * | 3/1999 | Beshai et al. .......... 370/395.21 |
| 6,920,112 | B1 | * | 7/2005 | McCloghrie et al. ....... 370/252 |
| 6,922,390 | B1 | * | 7/2005 | Chapman et al. ........... 370/232 |

OTHER PUBLICATIONS

Liu et al. "A Measurement-Based CAC Strategy for ATM Networks." Telecommunications & Information Sciences Laboratory, 0-7803-3925-8/97, IEEE, pp. 1714-1718.

* cited by examiner

*Primary Examiner*—Ricky Q. Ngo
*Assistant Examiner*—Warner Wong
(74) *Attorney, Agent, or Firm*—Cohen, Pontani, Lieberman & Pavane

(57) ABSTRACT

The present invention proposes a method for predicting a fill-up level of a buffer in an ATM network element, wherein for a respective one of at least one ongoing transmission connection (T1, . . . Ti, . . . Tn) via said ATM network element (ATM_NWE), cells (C1, . . . , Ci, . . . , Cn) are input to said buffer (BUF) with a respective input cell rate, and said ATM network element outputs said cells at a predetermined output cell rate; comprising the steps of: measuring a momentary fill-up level of said buffer after each respective time interval (A), determining a slope of the fill-up level of said buffer for the immediately preceding time interval, and estimating the fill-up level of said buffer to be reached after the subsequent time interval based on said slope of the fill-up level for the immediately preceding time interval. Also, the present invention proposes a method for connection admission control for such an ATM network element said method making use of the proposed scheme for predicting a fill-up level of said buffer in said ATM network element, and further denies and/or accepts a new transmission connection requested to be handled by said ATM network element based on the predicted fill-up level of said buffer. Still further, the present invention aims at correspondingly adapted control devices within an ATM network.

39 Claims, 7 Drawing Sheets

METHOD FOR PREDICTING A FILL-UP LEVEL OF A BUFFER IN AN ATM NETWORK ELEMENT

PRIORITY CLAIM

This is a national stage of PCT application No. PCT/EP99/08499, filed on Nov. 5, 1999. Priority is claimed on that application.

FIELD OF THE INVENTION

The present invention relates to a method for predicting a fill-up level of a buffer in an ATM network element, and more particularly, to such a method which can be used in connection with a connection admission control method for an ATM network element comprising a buffer.

BACKGROUND OF THE INVENTION

In recent years, the development of telecommunication networks has made large progress. Also, the traffic capacity and thus the data amount handled by such networks has considerably increased. One approach to cope with such a large data amount while still providing a high speed data transmission within such networks is to use the generally known ATM transmission concept (Asynchronous Transfer Mode).

In brief, according to the well known principles of ATM, the data to be transmitted are grouped into cells as a kind of data packets, supplied to an ATM network element at a respective input cell rate (depending on the type of transmission and/or connection), and output from the ATM element at an output cell rate which is predetermined for the ATM element. Such an ATM network element can be modeled as a buffer through which a plurality of incoming data cell streams (one per connection) are passed and the output is an output cell stream with a certain delay. Such a model is also referred to in literature as "leaky bucket" model.

However, with an increasing data amount to be handled and/or transmitted, the buffer capacity of the ATM network element becomes a limiting factor for the increase in the amount of transmitted data.

Thus, it has to be decided whether a new transmission connection can be admitted to be handled by the ATM network element and/or the ATM network. Such decision schemes are generally referred to as Connection Admission Control (CAC).

Connection Admission Control (CAC) has a key role when considering a maximum admissible load of the ATM network and a possible congestion (overload) in an individual network element or the whole network element. CAC methods should ensure that only those (new) connections are admitted which can be transmitted while assuring a certain level of Quality of Service (QoS).

Generally, any CAC method should be very quick and also effective. Various approaches have already been proposed in literature. However, if the method is a very effective one, i.e., one which may exploit the maximum capacity of the network, it will presumably be too slow as it needs too many calculations. In contrast thereto, if a speed optimized, i.e. a very fast method is implemented for CAC in the network, at least some capacity of the network will be wasted as it will never be used due to those fast methods being not so accurate. An optimum algorithm will have to compromise somewhere between those two extremes.

For example, K. Liu, D. W. Petr and C. Braun have proposed "A Measurement-Based CAC Strategy for ATM Networks", published as an IEEE publication with number 0-7803-3928-2/97/. In this publication, a two-part CAC strategy is proposed including a network initiated renegotiation of UPC (Usage Parameter Control) parameters, based on the result of the network keeping track of an actual resource usage of the user traffic.

However, due to the complexity of the proposed CAC strategy, this approach may be classified as belonging to the first kind of above mentioned extremes, entailing the associated drawbacks.

SUMMARY OF THE INVENTION

Hence, it is an object of the present invention to provide an improved method for predicting a fill-up level of a buffer in an ATM network element, and also to provide an improved method for connection admission control for an ATM network element comprising a buffer. Also, the present invention aims at the provision of a corresponding control device in an ATM network. According to the present invention, the above first object is achieved by a method for predicting a fill-up level of a buffer in an ATM network element, wherein for a respective one of at least one ongoing transmission connection via said ATM network element, cells are input to said buffer with a respective input cell rate, and said ATM network element outputs said cells at a predetermined output cell rate; the method comprising the steps of: measuring a momentary fill-up level of said buffer after each respective time interval, determining a slope of the fill-up level of said buffer for the immediately preceding time interval, and estimating the fill-up level of said buffer to be reached after the subsequent time interval based on said slope of the fill-up level for the immediately preceding time interval.

Furthermore, according to the present invention, the above second object is achieved by a method for connection admission control for an ATM network element comprising a buffer, wherein for a respective one of at least one ongoing transmission connection via said ATM network element, cells are input to said buffer with a respective input cell rate, and said ATM network element outputs said cells at a predetermined output cell rate; said method comprising the steps of: predicting a fill-up level of said buffer in said ATM network element according to any modification of the above mentioned method, and denying and/or accepting a new transmission connection requested to be handled by said ATM network element based on the predicted fill-up level of said buffer.

Still further, the present invention proposes an accordingly adapted control device in an ATM network.

Thus, with the present invention being implemented in an ATM network and/or an ATM network element, connection admission control can be improved. Particularly, due to the provision of the new parameter of the slope of the fill-up level curve, a fill-up level forecast can be established which can be used for connection admission control. Also, the determination of the slope is quite simple to be deduced from measurement results of a momentary and past actual fill-up level of the buffer.

Also, the forecasted value of the buffer fill-up level on the basis of the slope is a quite reliable result as the whole behaviour of the traffic does not depend on individual users and their unexpected behaviour in case of a high capacity network and the large amount of ongoing connetions. Thus, with an appropriately short time interval between slope calculations and/or determinations, each slope and corresponding forecasted value of the buffer fill-up level will be very close to the actual coming situation. Also, the forecasted fill-up level can be estimated based on a forecasted slope by taking into account more than one previously determined slope, so that the forecasted slope takes into account the history of the buffer fill-up level curve.

BRIEF DESCRIPTION OF THE DRAWINGS

The above and other features and advantages of the present invention will become fully apparent when referring to the following description in conjunction with drawings, in which.

DETAILED DESCRIPTION OF PREFERRED EMBODIMENTS

The present invention is now described in greater detail with reference to the drawings.

Figure 1:
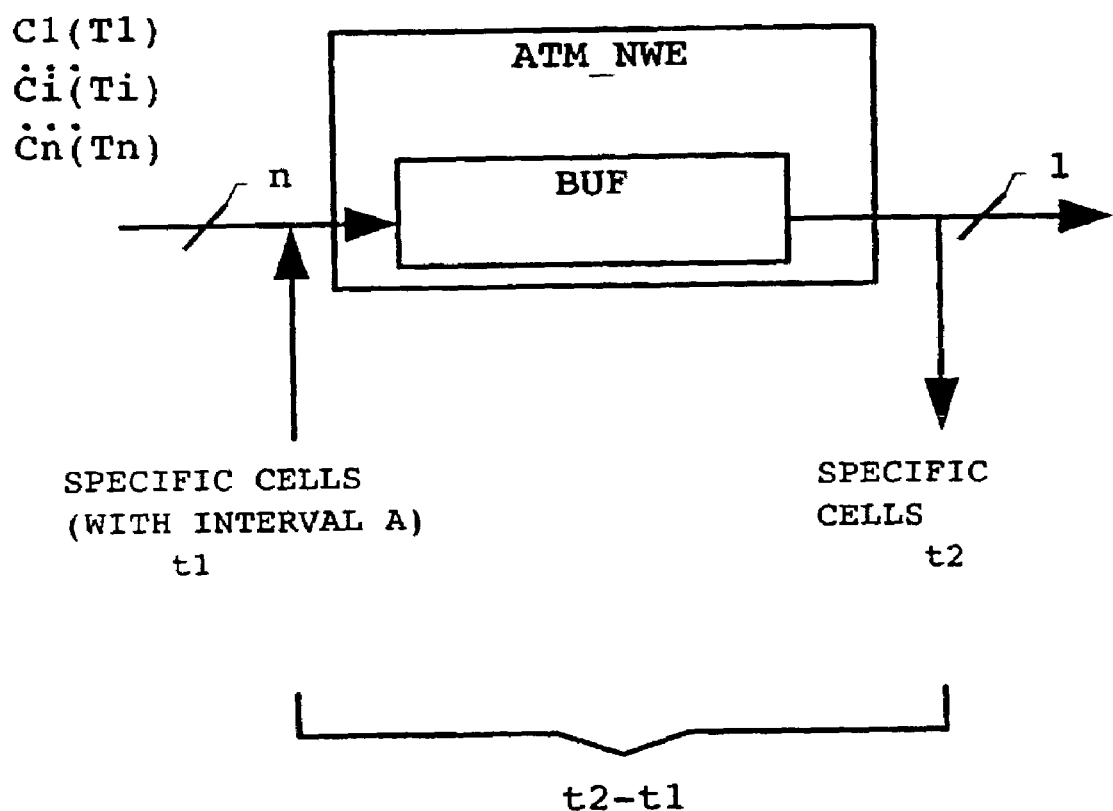
FIG. 1 shows a simplified and schematic block diagram of an ATM network element ATM_NWE for explaining the principles of buffer delay measurements.

FIG. 1 shows a simplified and schematic block diagram of an ATM network element ATM_NWE with reference to which the principles of buffer delay measurements are subsequently explained. As illustrated, the ATM network element ATM_NWE is modeled as comprising a buffer BUF. The ATM network element is illustrated as handling a number n of ongoing transmission connections T1, . . . Ti, . . . , Tn, and for each connection cells C1, . . . , Ci, . . . , Cn are input to said ATM network element at respective (possibly different) input cell rates. At the output side, the ATM network element outputs a stream of ATM cells with a predetermined output cell rate.

In order to measure the buffer's fill-up level, one of the most reasonable methods resides in the use of specific cells. The specific cells are introduced into the cell stream at the input side of the ATM network element and are read at the output side of the ATM network element, as indicated in FIG. 1. From the measured time difference between the input of the specific cells to the buffer (at time t1) and their appearance at the output thereof (at time t2), i.e. t2−t1, the delay imposed to the cells by the buffer can be calculated. Thus, the time difference t2−t1 represents the time the specific cell "spent" in the buffer, which time is directly comparable to the fill-up level of the buffer.

It should be noted that the expression "specific cell" as used herein above means, in one type of implementation, a special cell which is additionally introduced into said cells of said at least one ongoing transmission connection input to said buffer, while, in another type of implementation it also means that a specific cell is a marked cell (e.g. by setting a bit or byte at a predetermined position, i.e. a flag, in the header of the cell) among said cells of said at least one ongoing transmission connection input to said buffer. In case a specific cell is an additional one, this additional cell is removed from the cell stream at the output of the buffer as it does not form part of the data transmission as such, while in the other case the marked cell is read and, if necessary, the set flag is reset upon the cell having been read.

The specific cells are introduced into the input cell stream (input in the buffer) in regular intervals A. Nevertheless, how often they are introduced, i.e. how long or short the interval is, can be changed dependent on how closely the fill-up level of the buffer is wanted to be monitored and/or estimated, as will be explained later on in greater detail.

Figure 2:
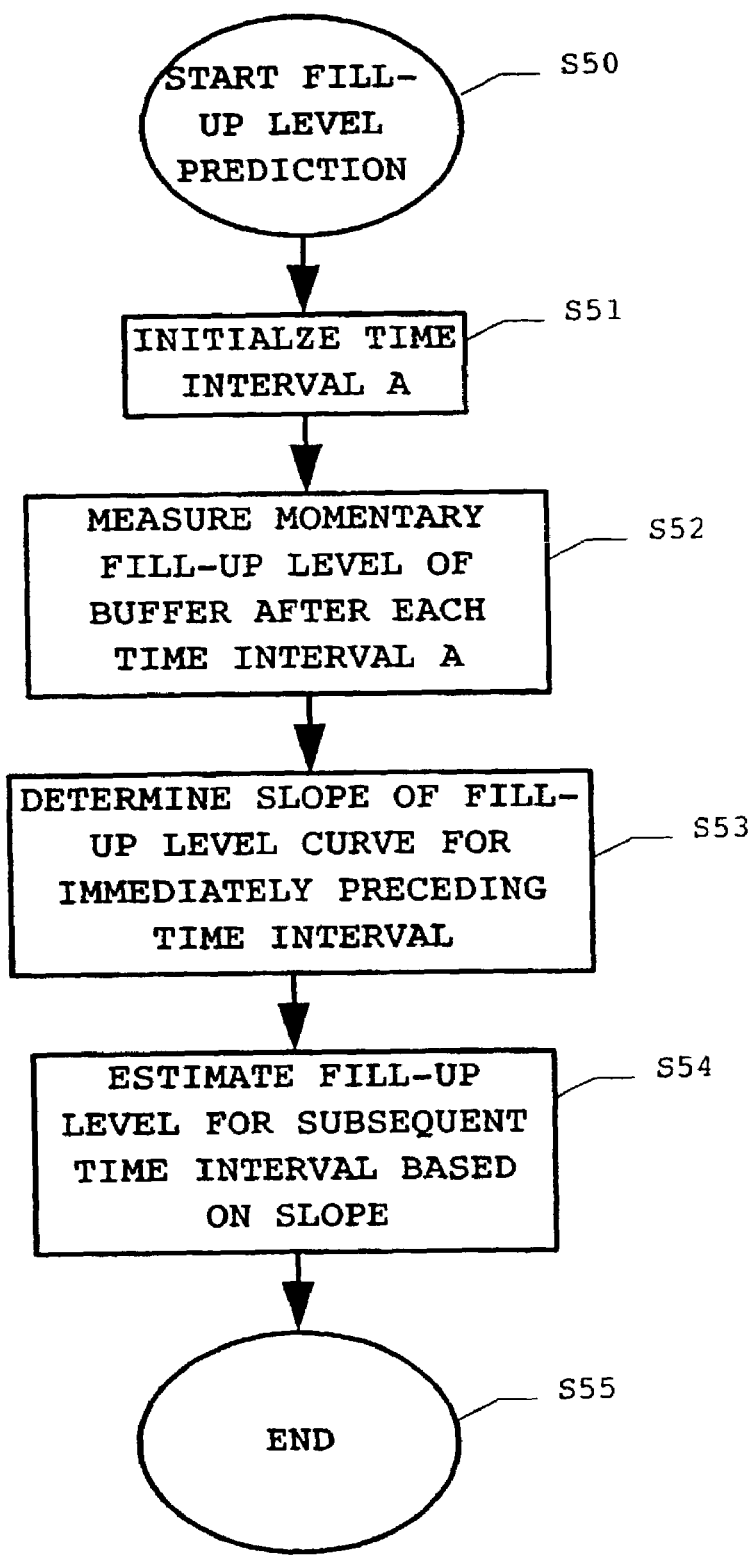
FIG. 2 illustrates a flow chart of a straight forward method for predicting a fill-up level of the buffer BUF in the ATM network element ATM_NWE.

FIG. 2 illustrates a flow chart of a straight forward method for predicting a fill-up level of the buffer BUF in the ATM network element ATM_NWE. The method for fill-up level prediction starts in a step S50. Then, in step S51, the time interval between successive specific cells input to the buffer and for measurement is initialized. Subsequently, in step S52, a respective momentary value of the fill-up level of the buffer is measured for and/or after, respectively, each respective time interval A. In step S53, a slope of the fill-up level of the buffer is determined for the immediately preceding time interval. Stated in other words, the slope of the fill-up level between individual measurement results of measured fill-up level is determined. Thereafter, in step S54, the fill-up level for a subsequent time interval is calculatively estimated based on the slope. Finally, the method flow ends in step S55.

Figure 3:
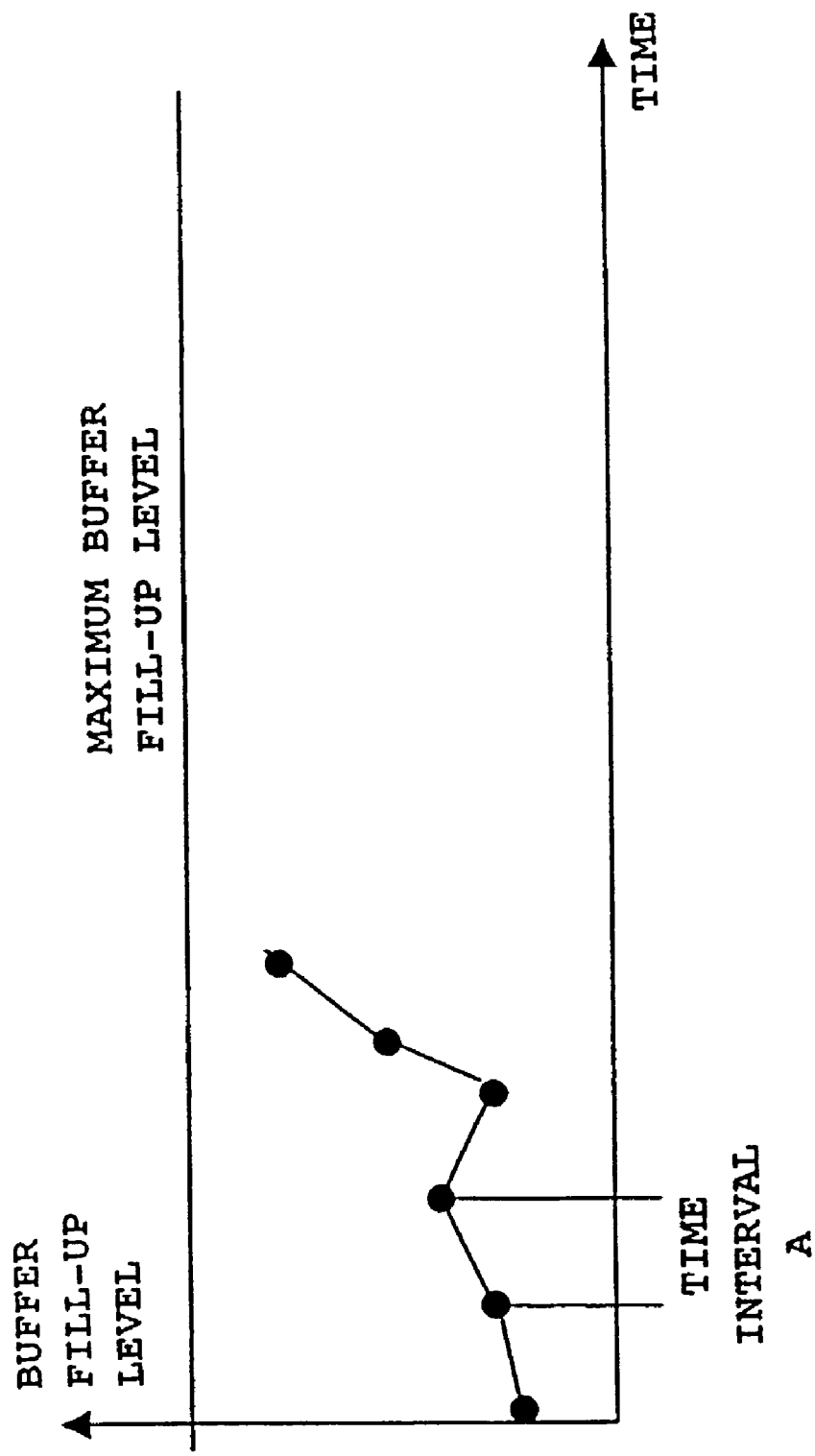
FIG. 3 illustrates an example of a fill-up level/buffer delay curve versus time.

FIG. 3 shows an example for the result obtained by such a processing. The delay caused by the buffer BUF, also referred to as the buffer delay, is plotted versus time. The maximum possible delay is caused by the maximum buffer size. After a respective time interval A, a measurement result for the buffer delay is obtained. As shown in FIG. 3, based on two consecutive measurement results, a slope of the delay curve which corresponds directly to the buffer fill-up level curve, is obtained. Stated in other words, for the period between two consecutive measurement results, a linear interpolation is performed and the buffer fill-up level is linearly approximated there between. Based on the determined slope and/or slopes, an estimate for the subsequent fill-up level (a time period A later) can be obtained by a linear extrapolation and/or estimation (not shown in this Figure).

Hitherto, the time interval A has mainly been described with a focus on a constant interval length. However, as has been mentioned earlier herein above, the interval may also be subject to changes during the execution of the method, as will be subsequently explained.

Namely, the method uses the time interval A for sending the specific cells after each such time period (as well as for measurement purposes at the buffer output). After the first time period A, according to the method, a delay value can be obtained after each time interval, which value represents the delay caused by the buffer in each such time intervals. The proposed method uses those individual, measured delay values for determining by calculation the slope between respective adjacent measurement values, i.e. a linear interpolation between the values is performed.

Depending on the value of the fill-up level of the buffer and/or the determined slope of the fill-up level, the method is adapted to decide how often the specific cells should be sent into the buffer and/or be measured at the output thereof.

Stated in other words, generally, the time interval A should be adjusted dependent on the measured fill-up level of the buffer (deduced from the measured delay caused by the buffer) and/or the determined slope of the fill-up level.

In order that measurements are conducted more frequently in a somewhat critical situation in which the buffer is nearly full, the time interval A should be adjusted to be decreasing with the increase of the measured fill-up level. For example, the relation between time interval A as a function of the buffer fill-up level or buffer delay, respectively, can be configured to be a linear, logarithmic and/or exponential relation. However, in any case, a minimum time interval Amin should be defined, so that the measurement itself does not lead to an overload.

Figure 4:
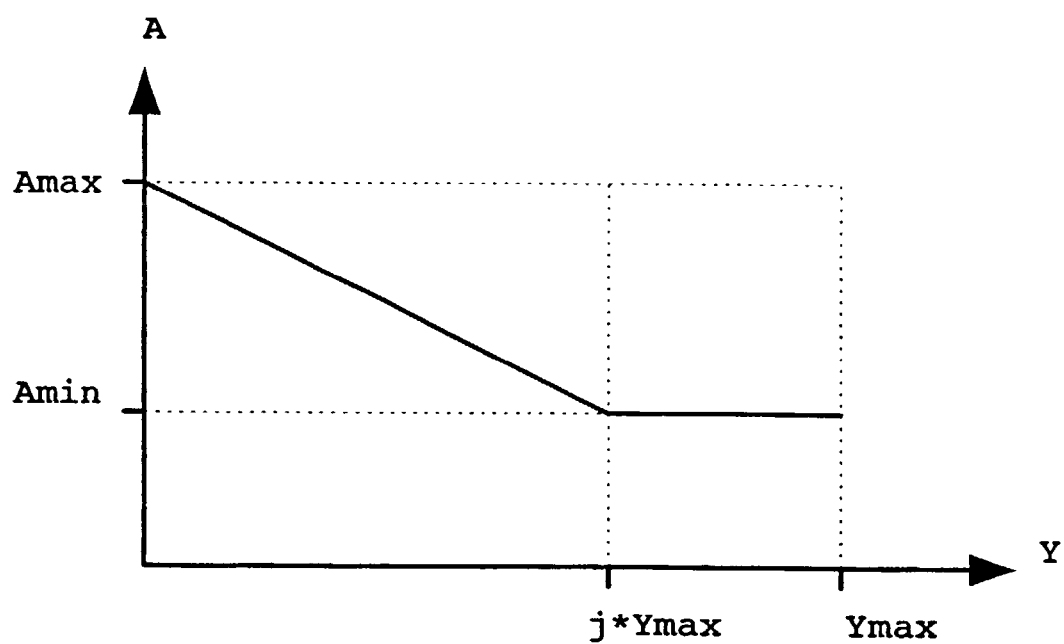
FIG. 4 illustrates a modification of the method of FIG. 2 as regards an adaptation of a measurement time interval A as a function of the buffer fill-up level.

FIG. 4 shows an example of a graph illustrating a conceivable dependency of the time interval A from the delay of the buffer. As illustrated, in an unloaded state of the buffer, the measurement time interval A assumes a maximum value Amax and decreases linearly with an increase in the buffer load state (i.e. fill-up level of and/or delay caused by the buffer) until a predetermined minimum level Amin is reached. For the relation in the illustrated FIG. 4, a piecewise linear example relation has been chosen which can be described as follows:

$$A = A\text{max} - ((A\text{max} - A\text{min})/(j*Y\text{max}))*y, \text{ for } y \leq j*Y\text{max}$$

$$A = A\text{min}, \text{ for } y > j*Y\text{max},$$

with y representing the buffer delay/fill-up level, Ymax representing the maximum possible delay caused by the buffer (i.e. when the buffer is filled up), j representing a factor of $j \leq 1$ for defining a threshold value from which on the minimum time interval Amin should be applied for measurement.

Also, the minimum value for the time interval Amin should be defined dependent on the maximum possible delay, for example as follows: Amin=z*Ymax, z<1.

It is however to be understood that the illustrated example is not to be considered as being limiting for the invention. That is, of course, also a piecewise linear relation containing more than two segments can be adopted. Still further, also a logarithmic or exponential relation could be defined for the dependency of the time interval A from the measured fill-up level of the buffer.

As mentioned before, the time interval A can also be adjusted dependent on the determined slope of the fill-up level of the buffer. In this connection, it is conceivable to adopt a relation such that said time interval A decreases in case of a positive slope, and increases in case of a negative slope. Particularly, the amount of decrease or increase of said time interval A is dependent on the amount of the positive or negative slope, respectively.

As mentioned above, the time interval A can be adjusted dependent on the measured fill-up level, or dependent on the determined slope. Nevertheless, it is of course also possible to combine these concepts for adjusting the time interval A dependent on the fill-up level and the slope, if desired.

Now, returning to step S54 in FIG. 2, the estimation of a fill-up level to be reached after the subsequent time interval A will be described in more detail. It has already been mentioned, that based on the determined slope and/or slopes, an estimate for the subsequent fill-up level (a time period A later) can be obtained by a linear extrapolation and/or estimation. This means that at least the slope determined for the immediately preceding time interval is used for this extrapolation.

Nevertheless, in a still further advantageous modification, the method is adapted in such a way that a step of keeping a record of a predetermined number of determined slopes of the fill-up level of said buffer for previous time intervals is provided, the record including at least the slope of the fill-up level for the immediately preceding time interval, and a resulting slope is calculated using said predetermined number of determined slopes, and wherein the resulting slope is thereafter used for estimating (extrapolating) the fill-up level of said buffer to be reached after the subsequent time interval.

Stated in other words, the resulting slope is calculated as an average of said predetermined number of slopes and can be considered as representing a kind of a forecasted slope which provides an information of a probable direction of the change in the fill-up level of the buffer within the next time period A. Advantageously, the average is a weighted average of said predetermined number of slopes, wherein the slope of the fill-up level for the immediately preceding time interval is multiplied by a weighting factor such that the slope of the fill-up level for the immediately preceding time interval has the strongest influence on the resulting slope. This prevents that the slope to be used for extrapolation is solely dependent on the immediately preceding buffer fill-up level, so that the extrapolation also takes into account part of the "younger history" of the buffer fill-up level, depending on the predetermined number of the slope values kept in the record.

Thus, depending on the weighting factor and/or the predetermined number of previously determined slopes kept in the record, the slope of the immediately preceding time interval A affects the forecasted buffer fill-up level to a rather strong extent. Determination of the resulting slope can be implemented for example by using binary logic circuits or by using a fuzzy logic implementation, and the specific way of implementation is not critical as long as the resulting slope value is obtained simple and fast.

Also, it is to be understood that such an averaged, resulting slope can also be used in connection with the method for adjusting the time interval A, if desired.

Thus, according to the method as presented so far, the method provides the parameters which represent the momentary fill-up level and also a slope of the fill-up level for at least the immediately preceding time interval A, but preferably the slope of the fill-up level of the buffer for more than one preceding time interval A, so that on the basis thereof a forecasted slope for extrapolation of the subsequently reached fill-up level can be obtained.

The momentary fill-up level value is a real-time value of the buffer fill-up level which is updated for every time period A.

Thus, the parameters provided by the method as discussed so far can be used to bargain for the coming congestion of the ATM network element and/or the network itself. Also, it can be used just for having an information as to which fill-up levels of the buffers have to be expected in the near future (after the subsequent time interval A). When using short time intervals A between fill-up level determination and/or slope determination and, hence, fill-up level estimation and/or slope forecasting, the estimated fill-up level values will be close to the actual approaching situation.

Particularly, the parameters as discussed can be used for connection admission control CAC as will be explained with reference to FIGS. 5 and 6 of the drawings.

Figure 5:
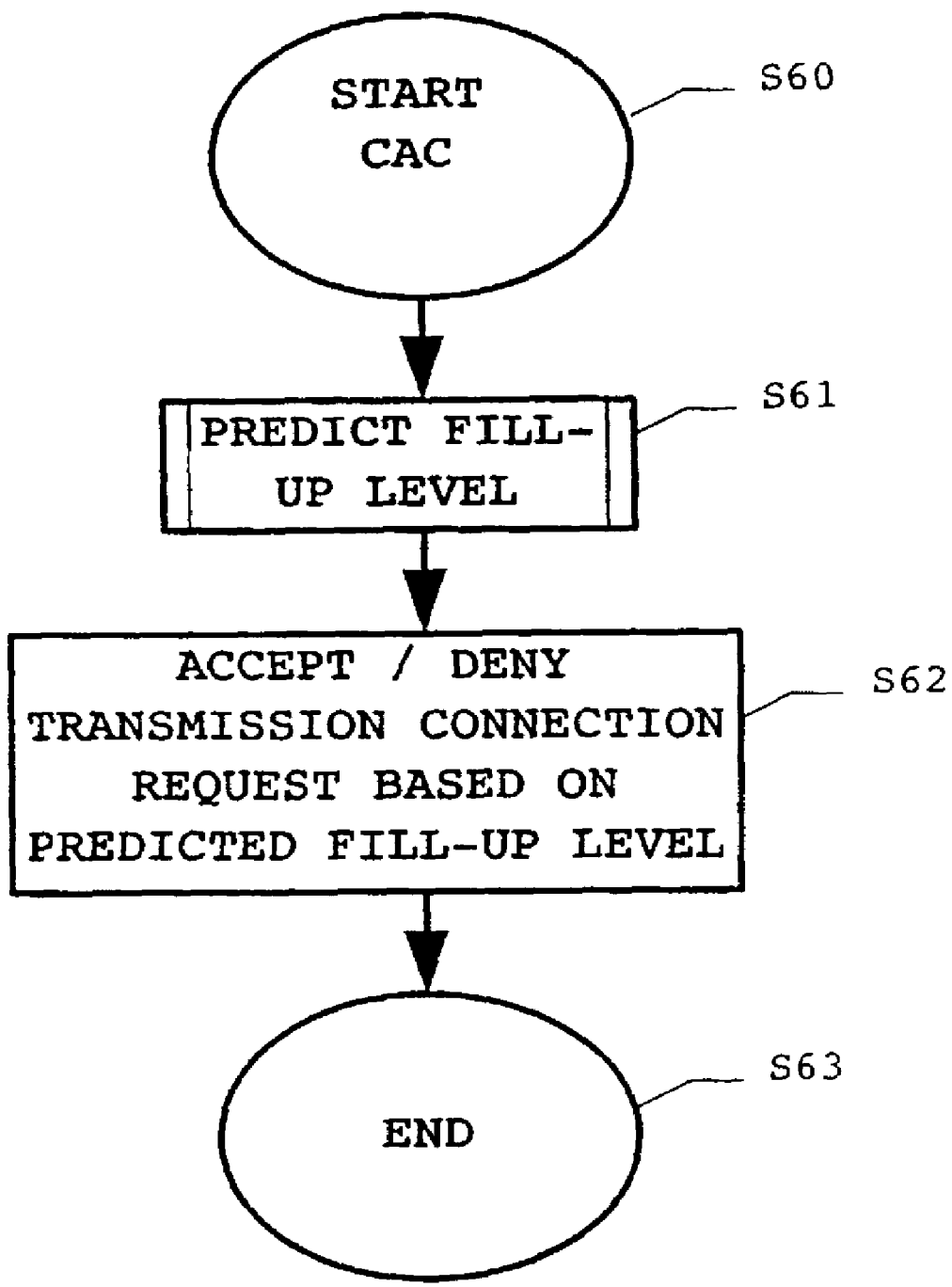
FIG. 5 illustrates a flow chart of a straight forward method for connection admission control CAC based on the predicted fill-up level of the buffer BUF in the ATM network element ATM_NWE.

FIG. 5 illustrates a basic flow chart of a method for connection admission control CAC based on the predicted fill-up level of the buffer BUF in the ATM network element ATM_NWE. As shown in FIG. 5, the method starts in a step S60. Thereafter, a fill-up level prediction subroutine is started, step S61. The predicting step is performed as discussed herein above in detail, so that a repeated discussion thereof is considered to be dispensable here.

Based on the fill-up level of the buffer as predicted in step S61, in a follow-up step S62, a decision as to whether a requested new transmission connection is to be accepted or to be denied is taken, whereafter the method ends, step S63.

In order to avoid an excessive processing load for an accordingly adapted control device in an ATM network, which is adapted to perform the method steps involved in the CAC method as well as those involved in the buffer fill-up level prediction, the method shown in FIG. 5 may be suitably modified as follows.

That is, the momentary value of the buffer fill-up level can be monitored, and based on its momemtary value, i.e. when a certain (arbitrarily determined) threshold value is exceeded (e.g. 60% of the maximum fill-up level of the buffer) the prediction of the fill-up level is started and used for CAC as explained before.

Now, decision criteria applied in step S62 will be discussed. According to one criterion, a new transmission connection requested to be handled by said ATM network is accepted if said estimated fill-up level is not above a maximum fill-up level of said buffer, while a new transmission connection requested to be handled by said ATM network is denied if said estimated fill-up level is above a maximum fill-up level of said buffer.

Alternatively, the method can be adapted such that a new transmission connection requested to be handled by said ATM network is denied if said estimated fill-up level reaches a predetermined reference level exceeding said maximum fill-up level of said buffer by a predetermined amount.

Figure 6:
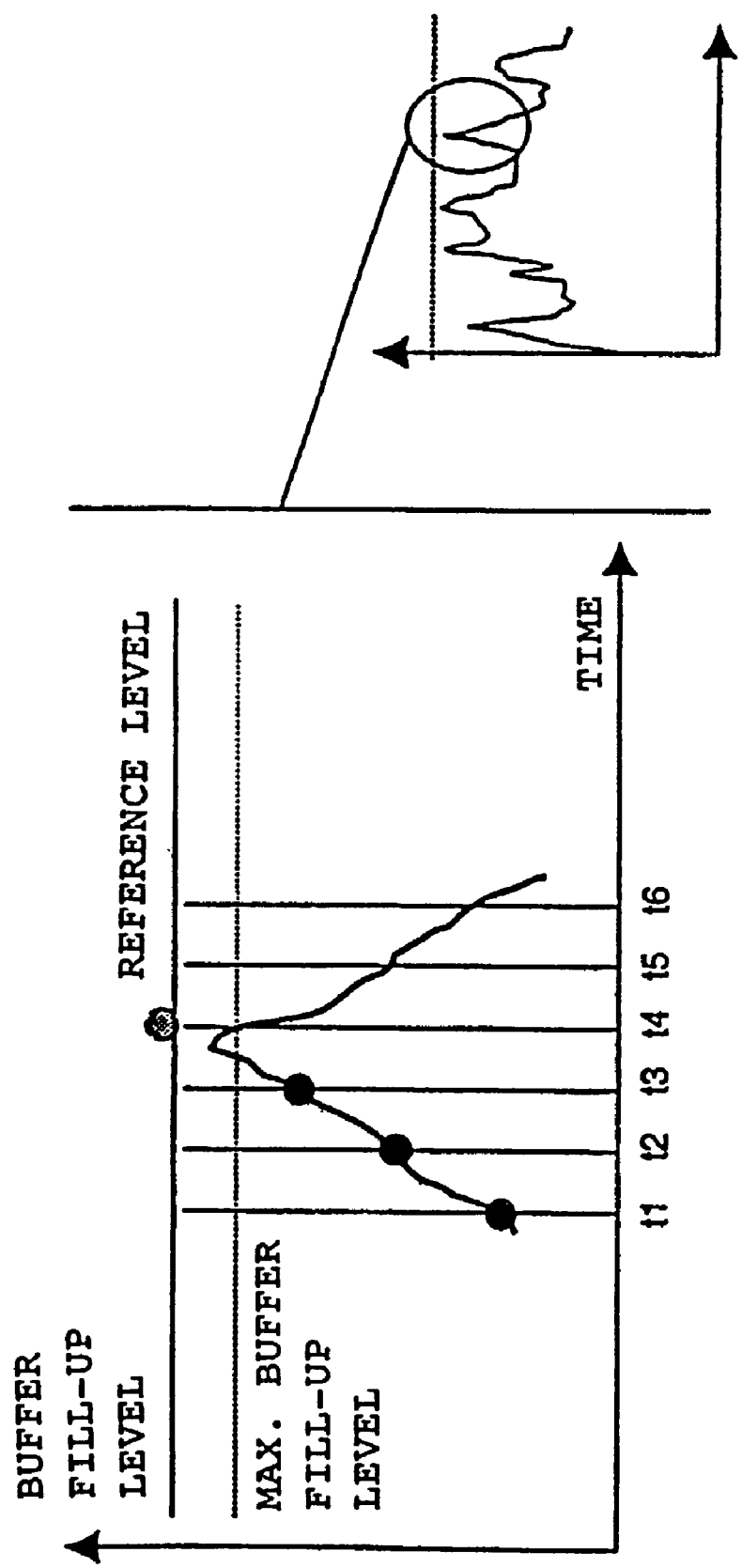
FIG. 6 shows an other example of a fill-up level/buffer delay curve versus time for explaining the CAC measures to be taken.

FIG. 6 shows an other example of a fill-up level/buffer delay curve versus time for explaining the above CAC measures to be taken. The left hand part of the Figure illustrates an enlarged part of a traffic curve as it can be expected in case of a VBR (Variable Bit Rate) running (for a longer period of time) over the ATM network or network element, respectively (shown in the smaller right hand part of the Figure). Specifically, the measured buffer fill-up level is plotted over time. Measured values which are measured at times t1, t2, t3 are indicated as bold circles and a forecasted value for a point of time t4 (under the assumption that a current time is t3) is printed as a hatched circle. Additionally, a maximum fill-up level of the buffer and a reference level (to be explained later) exceeding the maximum fill-up level are indicated. Note that the time difference between t4–t3, t3–t2, t2–t1 may be assumed to be A, as A is assumed not to change any longer in the illustrated example in this range of the fill-up level.

Under the assumption of t3 being the current time, the slopes between t3 and t2, and t2 and t1 were calculated, and based on at least the last slope (between t3 and t2) the forecasted value for time t4 has been estimated. Apparently, the forecasted value represents an result indicating that the buffer will probably overflow in the time period between t3 and t4.

The CAC method proposed above can use this information when deciding whether a new connection is to be accepted or not.

In case any new connection is denied during the time from t3 to t4, the quality of service QoS in the ATM network will be safely ensured. However, in such a case, some transmission capacity will be lost (the difference between the fill-up level at time t3 up to the maximum fill-up level). Therefore, a reference value exceeding the maximum load has been defined, and only if the forecasted value exceeds this reference value, all new connection requests will be denied. In the region between maximum level and reference level, still "some" connections could be accepted without causing a congestion or overload (congestion will invoke congestion control which leads to discarding of cells and frames). For example, dependent on the number of connection attempts or requests per time interval, those connection requests could still be admitted. Alternatively, if the forecasted value of the fill-up level is between the maximum and the reference value, for example only prioritized connection attempts such as emergency calls could be accepted.

Thus, the CAC method can advantageously use the forecasted value of the buffer fill-up level in various ways as a parameter which informs the system or network, whether new requested connections can be accepted or not.

Also, the difference between the reference level and the maximum fill-up level can be defined dynamically, e.g. dependent on the forecasted value of the fill-up level and/or an the slope used for forecasting said value. For example, in case of a steep slope, the reference value should be closer to the maximum fill-up level value than otherwise.

Although the present invention has herein before been described with a focus on the method as such, it is to be understood that the present invention also concerns an accordingly adapted control device.

Figure 7:
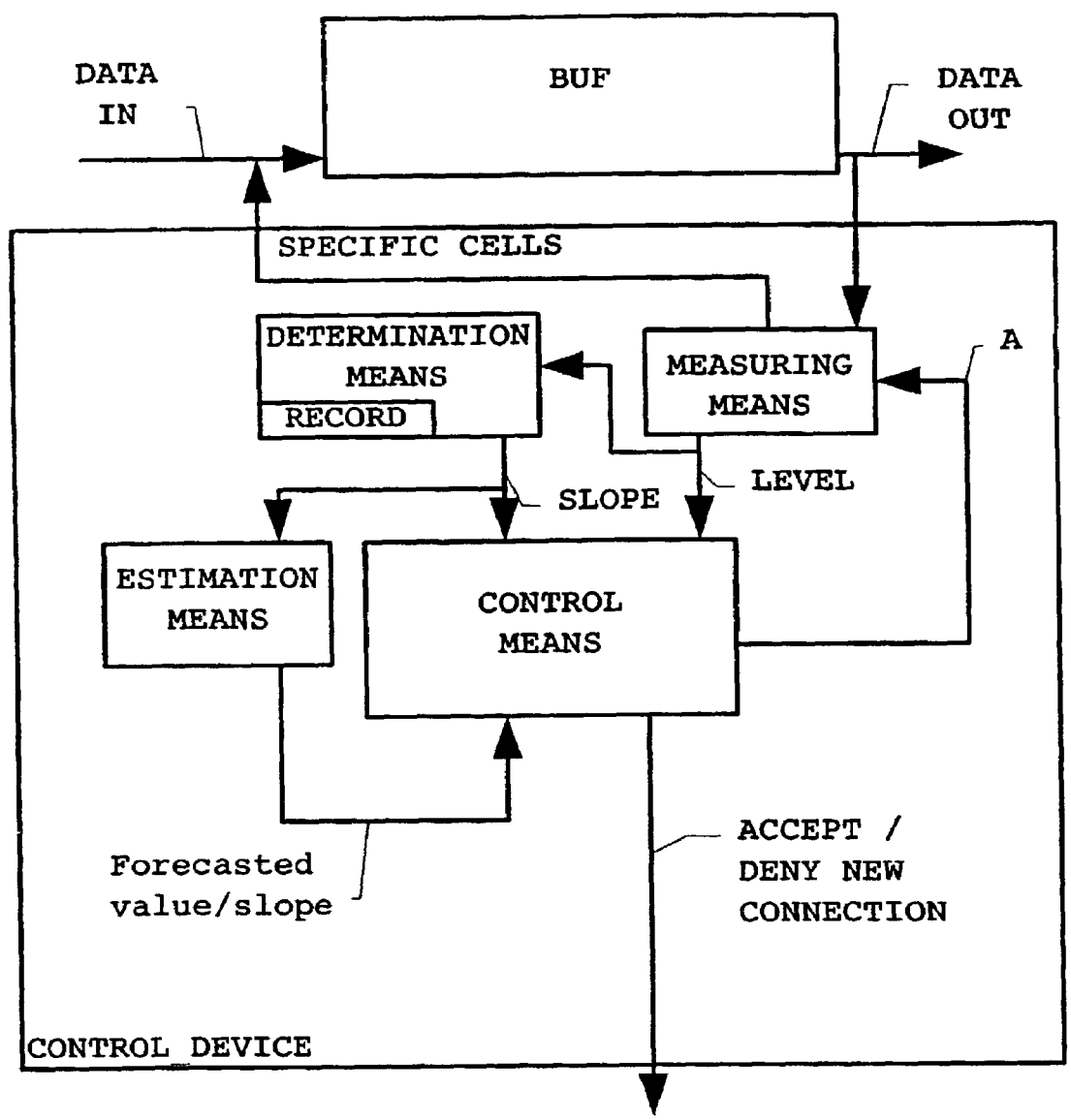
FIG. 7 of the drawings illustrates a simplified block circuit diagram of a control device according to the present invention.

FIG. 7 of the drawings illustrates a simplified block circuit diagram of such a control device. The control device may be located within the ATM network element or may be provided separately therefrom. Irrespective thereof, its basic construction is as follows.

A measuring means provides the specific cells to the data cell stream input to the buffer means, and reads the specific cells output from the buffer after they have experienced a certain delay due to passing the buffer, the delay being dependent on the buffer fill-up level. Thus, based on the read specific cells, the measurement means measures the experienced delay which directly corresponds to the fill-up level.

The fill-up level is supplied to a determination means which determines the slope between adjacent levels, i.e. the slope for at least the preceding time interval A. Also, as shown in FIG. 7, the determination means comprises a record element for keeping a record of a predetermined number of (previous) slope values.

The determined slope also referred to as resulting slope (i.e. the immediately preceding slope and/or an averaged and/or a weighted averaged slope as described above) is supplied together with the momentary measured level to a control means. Based on one or both of these values, the control means controls the length of the time interval A, as previously described, and supplies a newly determined time interval A to the measurement means for measurement purposes.

Also, the determined slope is fed to an estimation means which estimates a forecasted fill-up level of the buffer based on the slope, the currently measured fill-up level and the time interval A.

The forecasted fill-up level value is in turn supplied to the control means which issues an accept/deny new connection control signal based on the forecasted value.

Of course, as mentioned previously, in a modification (not shown) the control means can be adapted to control (enable) the slope determination and estimation based on a measured level. IN such a case, additional internal enable signals will have to be provided. However, in order to keep the illustration simple and understandable, those enable signals are not illustrated in the Figure.

Accordingly, as has been described in detail herein before, the present invention proposes a method for predicting a fill-up level of a buffer in an ATM network element, wherein for a respective one of at least one ongoing transmission connection T1, ..., Ti, ... Tn via said ATM network element ATM_NWE, cells C1, ..., Ci, ..., Cn are input to said buffer BUF with a respective input cell rate, and said ATM network element outputs said cells at a predetermined output cell rate; comprising the steps of: measuring a momentary fill-up level of said buffer after each respective time interval A, determining a slope of the fill-up level of said buffer for the immediately preceding time interval, and estimating the fill-up level of said buffer to be reached after the subsequent time interval based on said slope of the fill-up level for the immediately preceding time interval. Also, the present invention proposes a method for connection admission control for such an ATM network element said method making use of the proposed scheme for predicting a fill-up level of said buffer in said ATM network element, and further denies and/or accepts a new transmission connection requested to be handled by said ATM network element based on the predicted fill-up level of said buffer. Still further, the present invention aims at correspondingly adapted control devices within an ATM network.

It should be understood that the above description and accompanying figures are merely intended to illustrate the present invention by way of example only. The preferred embodiments of the present invention may thus vary within the scope of the attached claims.

What is claimed is:

1. A method for predicting a fill-up level of a buffer in an ATM network element, wherein for a respective one of at least one ongoing transmission connection via said ATM network element, cells are input to said buffer with a respective input cell rate, and said ATM network element outputs said cells at a predetermined output cell rate, the method comprising:
    measuring a momentary fill-up level of said buffer after each respective time interval;
    determining a slope of the fill-up level of said buffer for an immediately preceding time interval; and
    estimating the fill-up level of said buffer to be reached after a subsequent time interval based on said slope of the fill-up level for the immediately preceding time interval;
    wherein said momentary fill-up level of said buffer is measured based on a delay time experienced by a specific cell input to said buffer at a first time until said specific cell is output from said buffer at a second time.

2. The method of claim 1, further comprising:
    inputting a specific cell to said buffer after each respective time interval.

3. The method of claim 1, wherein said specific cell is a special cell additionally introduced into said cells of said at least one ongoing transmission connection input to said buffer.

4. The method of claim 1, wherein said specific cell is a marked cell among said cells of said at least one ongoing transmission connection input to said buffer.

5. The method of claim 1, further comprising:
    adjusting said respective time interval depending on the measured fill-up level of said buffer.

6. The method of claim 5, wherein said time interval decreases with an increasing fill-up level.

7. The method of claim 6, wherein said time interval decreases linearly, logarithmically or exponentially with an increasing fill-up level.

8. The method of claim 6, wherein said time interval decreases down to a minimum value.

9. The method of claim 1, further comprising:
    adjusting said respective time interval depending on the determined slope of the fill-up level of said buffer.

10. The method of claim 9, wherein said time interval decreases in case of a positive slope, and increases in case of a negative slope.

11. The method of claim 10, wherein said amount of decrease or increase of said time interval is dependent on the amount of an positive or negative slope, respectively.

12. The method of claim 1, said estimating further comprises:
    keeping a record of a predetermined number of determined slopes of the fill-up level of said buffer for previous time intervals, said record including at least the slope of the fill-up level for the immediately preceding time interval; and
    calculating a resulting slope using said predetermined number of determined slopes;
    wherein said estimation step uses the resulting slope for estimating the fill-up level of said buffer to be reached after the subsequent time interval.

13. The method of claim 12, wherein said calculating calculates an average of said predetermined number of slopes as a resulting slope.

14. The method of claim 13, wherein said average is a weighted average of said predetermined number of slopes, wherein the slope of the fill-up level for the immediately preceding time interval is multiplied by a weighting factor such that the slope of the fill-up level for the immediately preceding time interval has a strongest influence on the resulting slope.

15. A method for connection admission control for an ATM network element comprising a buffer, wherein for a respective one of at least one ongoing transmission connection via said ATM network element, cells are input to said buffer with a respective input cell rate, and said ATM network element outputs said cells at a predetermined output cell rate, said method comprising:
    predicting a fill-up level of said buffer in said ATM network element according to the method of claim 1; and
    denying and/or accepting a new transmission connection requested to be handled by said ATM network element based on the predicted fill-up level of said buffer.

16. The method of claim 15, wherein a new transmission connection requested to be handled by said ATM network is accepted if said estimated fill-up level is not above a maximum fill-up level of said buffer.

17. The method of claim 15, wherein a new transmission connection requested to be handled by said ATM network is denied if said estimated fill-up level is above a maximum fill-up level of said buffer.

18. The method of claim 15, wherein a new transmission connection requested to be handled by said ATM network is denied if said estimated fill-up level reaches a predetermined reference level exceeding said maximum fill-up level of said buffer by a predetermined amount.

19. The method according to claim 2, wherein said respective time interval is adjusted depending on the measured fill-up level of said buffer.

20. The method of claim 2, wherein said respective time interval is adjusted depending on the determined slope of the fill-up level of said buffer.

21. The method of claim 5, wherein said respective time interval is adjusted depending on the determined slope of the fill-up level of said buffer.

22. A control device in an ATM network, configured to predict a fill-up level of a buffer in an ATM network element, wherein for a respective one of at least one ongoing transmission connection via said ATM network element, cells are input to said buffer with a respective input cell rate, and said ATM network element outputs said cells at a predetermined output cell rate, the control device comprising:
a measuring unit configured to measure a momentary fill-up level of said buffer after each respective time interval;
a determination unit configured to determine a slope of the fill-up level of said buffer for an immediately preceding time interval;
an estimation unit configured to estimate the fill-up level of said buffer to be reached after the subsequent time interval based on said slope of the fill-up level for the immediately preceding time interval;
wherein said measuring unit is configured to measure the momentary fill-up level of said buffer based on a delay time experienced by a specific cell input to said buffer at a first time until said specific cell is output from said buffer at a second time.

23. The control device of claim 22, further comprising:
an input unit configured to input a specific cell to said buffer after each respective time interval.

24. The control device of claim 22, wherein said specific cell is a special cell additionally introduced into said cells of said at least one ongoing transmission connection input to said buffer.

25. The control device of claim 22, wherein said specific cell is a marked cell among said cells of said at least one ongoing transmission connection input to said buffer.

26. The control device of claim 22, further comprising:
a control unit configured to adjust said respective time interval depending on the measured fill-up level of said buffer.

27. The control device of claim 26, wherein said time interval decreases with an increasing fill-up level.

28. The control device of claim 27, wherein said time interval decreases linearly, logarithmically or exponentially with an increasing fill-up level.

29. The control device of claim 27, wherein said time interval decreases downward to a minimum value.

30. The control device of claim 22, further comprising:
a control unit configured to adjust said respective time interval depending on the determined slope of the fill-level of said buffer.

31. The control device of claim 30, wherein said time interval decreases in case of a positive slope, and increases in case of a negative slope.

32. The control device to of claim 31, wherein said amount of decrease or increase of said time interval is dependent on the amount of the positive or negative slope, respectively.

33. The control device of claim 22, wherein said determination unit further comprises:
a memory unit configured to keep a record of a predetermined number of determined slopes of the fill-up level of said buffer for previous time intervals, said record including at least the slope of the fill-up level for the immediately preceding time interval;
a calculator unit configured to calculate a resulting slope using said predetermined number of determined slopes; and
an output unit configured to output the resulting slope to the estimation unit for estimating the fill-up level of said buffer to be reached after the subsequent time interval.

34. The control device of claim 33, wherein said calculator unit is configured to calculate an average of said predetermined number of slopes as a resulting slope.

35. The control device of claim 34, wherein said average is a weighted average of said predetermined number of slopes, wherein the slope of the fill-up level for the immediately preceding time interval is multiplied by a weighting factor such that the slope of the fill-up level for the immediately preceding time interval has a strongest influence on the resulting slope.

36. A control device in an ATM network, configured for connection admission control for an ATM network element comprising a buffer, wherein for a respective one of at least one ongoing transmission connection via said ATM network element, cells are input to said buffer with a respective input cell rate, and said ATM network element outputs said cells at a predetermined output cell rate, said device comprising:
a predicting unit configured to predict a fill-up level of said buffer in said ATM network element according to the control device of claim 22; and
a control unit configured to deny or to accept a new transmission connection requested to be handled by said ATM network element based on the predicted fill-up level of said buffer.

37. The control device of claim 36, wherein a new transmission connection requested to be handled by said ATM network is accepted if said estimated fill-up level is not above a maximum fill-up level of said buffer.

38. The control device of claim 36, wherein a new transmission connection requested to be handled by said ATM network is denied if said estimated fill-up level is above a maximum fill-up level of said buffer.

39. The control device of claim 36, wherein a new transmission connection requested to be handled by said ATM network is denied if said estimated fill-up level reaches a predetermined reference level exceeding said maximum fill-up level of said buffer by a predetermined amount.

* * * * *